United States Patent
Mead, Jr. et al.

(10) Patent No.: US 6,774,870 B2
(45) Date of Patent: *Aug. 10, 2004

(54) GIMBAL-MOUNTED VIRTUAL REALITY DISPLAY SYSTEM

(75) Inventors: Russell C. Mead, Jr., San Francisco, CA (US); Ian McDowall, Palo Alto, CA (US); Mark Bolas, Mountain View, CA (US)

(73) Assignee: Fakespace Labs, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/154,171

(22) Filed: May 21, 2002

(65) Prior Publication Data

US 2002/0140634 A1 Oct. 3, 2002

Related U.S. Application Data

(63) Continuation of application No. 09/624,939, filed on Jul. 25, 2000, now Pat. No. 6,396,462, which is a continuation of application No. 08/630,948, filed on Apr. 5, 1996, now Pat. No. 6,094,180.

(51) Int. Cl.[7] .................................................. G09G 5/00
(52) U.S. Cl. .......................... 345/8; 345/156; 248/603; 361/681; 434/43
(58) Field of Search ................................. 345/7–8, 156, 345/157, 161; 248/188.1, 603, 160, 622, 163.1, 274.1; 361/680, 681, 679; 463/1–2; 434/43

(56) References Cited

U.S. PATENT DOCUMENTS

| | | | |
|---|---|---|---|
| 3,288,421 A | 11/1966 | Peterson | 248/163.1 X |
| 3,295,224 A | 1/1967 | Cappel | 248/163.1 X |
| 3,374,977 A | 3/1968 | Moy, Jr. | 248/163.1 |
| 4,066,256 A | 1/1978 | Trumbull | 472/60 |
| 4,069,995 A | 1/1978 | Miller | 248/160 X |
| 4,330,779 A | 5/1982 | Wilensky | 345/7 |
| 4,713,007 A | 12/1987 | Alban | 434/45 |
| 4,895,376 A * | 1/1990 | Chiang Shiung-Fei | 463/2 |
| 5,308,296 A | 5/1994 | Eckstein | 482/5 |
| 5,451,134 A | 9/1995 | Bryfogle | 414/680 |
| 5,490,784 A | 2/1996 | Carmein | 434/55 |
| 5,496,220 A | 3/1996 | Engstrand | 472/60 |
| 5,674,127 A | 10/1997 | Horstmann | 463/42 |
| 5,682,171 A | 10/1997 | Yokoi | 345/7 |
| 5,798,739 A | 8/1998 | Titel | 345/8 |
| 5,971,268 A * | 10/1999 | Lynch et al. | 235/1 R |
| 6,094,180 A * | 7/2000 | Mead, Jr. et al. | 345/8 |
| 6,396,462 B1 * | 5/2002 | Mead, Jr. et al. | 345/7 |

* cited by examiner

Primary Examiner—Amr Awad
(74) Attorney, Agent, or Firm—K. David Crockett, Esq.; Crockett & Crockett

(57) ABSTRACT

A compliant structure which includes a means for sensing translation and rotation of a top plate is disclosed. The structure is composed of a base plate and three supporting legs. The legs are compliant. The deflections of the structure are substantially in a plane and the translation and twist of the top platform may be measured by the gimbaled sensor assembly attached to one of the legs.

6 Claims, 7 Drawing Sheets

GIMBAL-MOUNTED VIRTUAL REALITY DISPLAY SYSTEM

RELATED PATENT APPLICATIONS

This application is a continuation of application Ser. No. 09/624,939 filed Jul. 25, 2000, now U.S. Pat. No. 6,396,462, which is a continuation of application Ser. No. 08/630,948 filed Apr. 5, 1996, now U.S. Pat. No. 6,094,180.

FIELD OF THE INVENTIONS

This invention relates to the art of mechanical structures whose deformation can be easily measured.

BACKGROUND OF THE INVENTIONS

In the field of virtual reality, displays are mounted on structures which can be manipulated by a user. The motion of the display is measured and is used to control the user's view point in a computer generated world. Such devices are exemplified by the art described in U.S. Pat. No. 5,436,638. Making a suitable structure for mounting a display on is a challenge, one desires that the display be movable with little force. It is also desirable that the platform encourages controllable motion which means that the perceived stiffness in the left-right directions be matched with forward-back and that twist also feels similarly stiff. As detailed in U.S. Pat. No. 5,436,638 it is desired that it be possible for the structure to facilitate rotations about a user. This invention provides that flexibility in a way which is easy to sense and measure.

SUMMARY

A structure suitable for holding a display is the object of this invention. The platform is supported by three compliant members. One of these members is attached to a gimbaled mechanism which facilitates the easy measurement of the deflection of the platform as it is moved by the user.

DETAILED DESCRIPTION OF THE INVENTIONS

Figure 1:
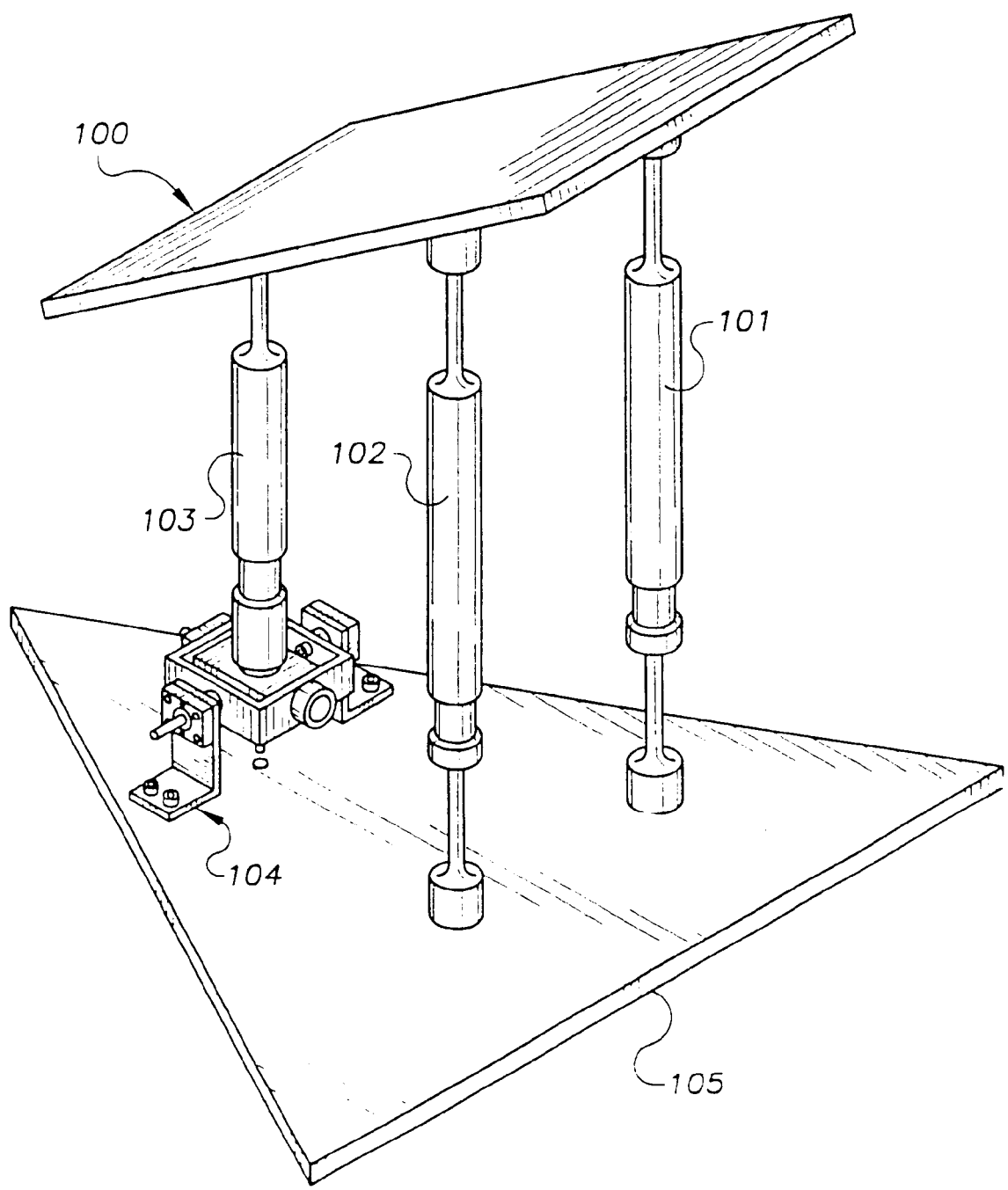
FIG. 1 shows the three legged structure, the plate where a display may be mounted, and the tracking assembly.

FIG. 1 shows the front view of the invention. The compliant measured structure is composed of a base plate 105 which supports the plate for the display 100 on three compliant delrin legs. The front legs 101 and 102 provide support for plate 100. The rear leg 103 provides support to plate 100 and mates with the gimbaled sensor assembly 104. The plate 100 is thus supported in a way such that it can be moved forward/back, side to side, and rotated about an arbitrary vertical axis. When the plate 100 is moved from its rest position, the three legged structure holds it level and the legs flex to accommodate the new position. As the legs flex, the display will move in the desired direction and will also get closer to the base 105 by a tiny amount. Deflections of the legs are generally small—in the range of about ±10 degrees or so.

Figure 2:
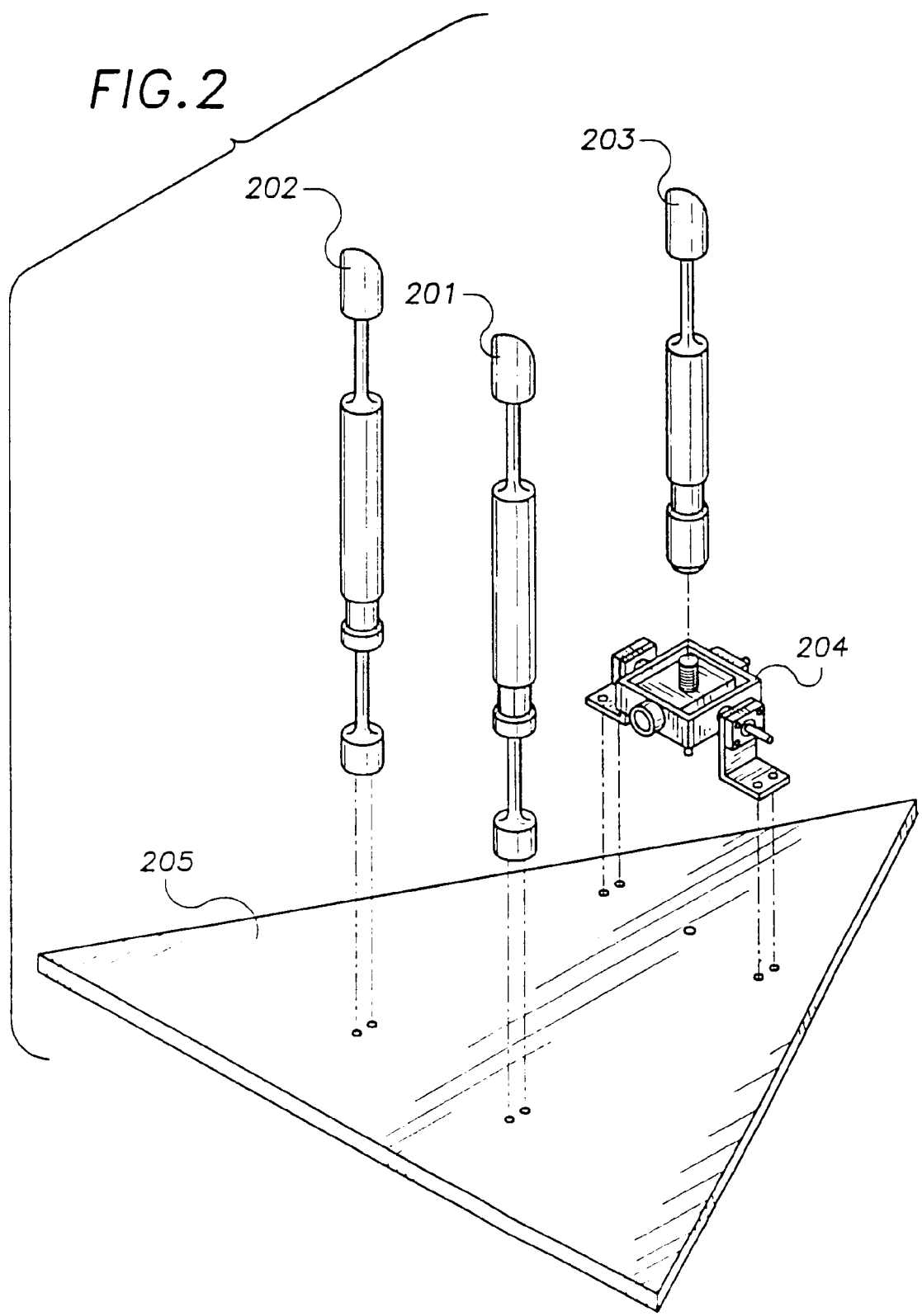
FIG. 2 is an exploded view of the base, legs, and sensor assembly.

FIG. 2 illustrates how the device is put together. The legs 201 and 202 are mounted directly onto base plate 205 with each leg being attached with two screws to the base plate so the legs 201 and 202 can not rotate in place. The gimbaled assembly 204 is also rigidly mounted onto base plate 205. The top of the gimbaled assembly is threaded and attaches to leg 203.

Figure 3:
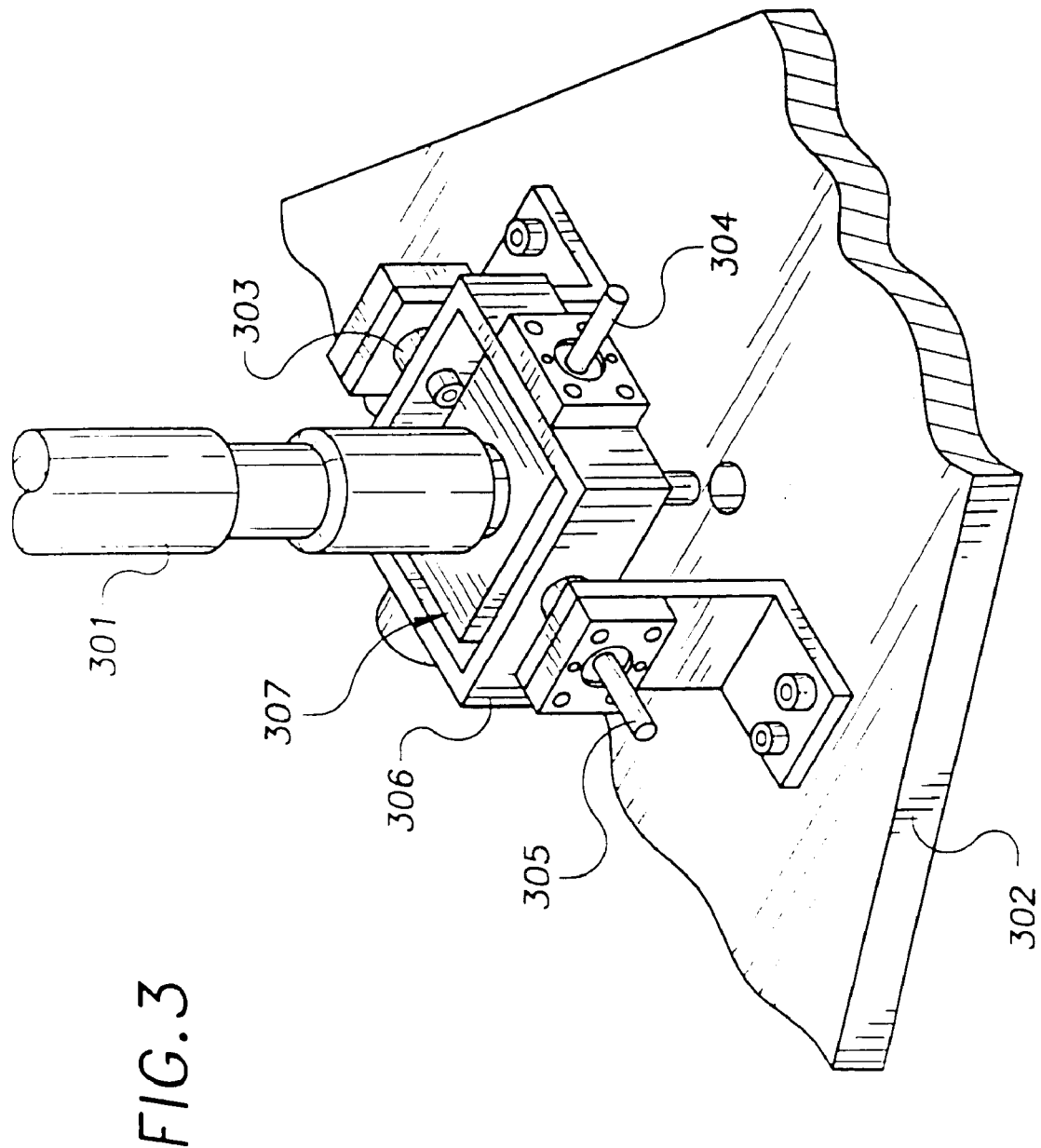
FIG. 3 shows the sensor assembly.

FIG. 3 shows the gimbaled assembly in more detail. The gimbaled assembly is mounted on base plate 302. The rear leg 301 is attached to the gimbaled assembly and the shaft which is attached to the leg 301 passes through block and rotary bearing 307. Rotary joint 303 provides rotation of frame 306 so that shaft and rotary joint 305 can measure the angle of leg 301 in the forward/back plane. The deflection of the leg 301 is transferred through block 307 to frame 306 which is measured by an encoder mounted on 305. The left/right motion of the top plate is transferred to a rotation of leg 301 which is transferred to block 307 and is measured by an encoder mounted on shad 304. Thus we can see two of the three degrees of freedom of the gimbaled assembly—forward/back motion will appear at shaft 305 and left/right motion will appear at shaft 304.

Figure 4:
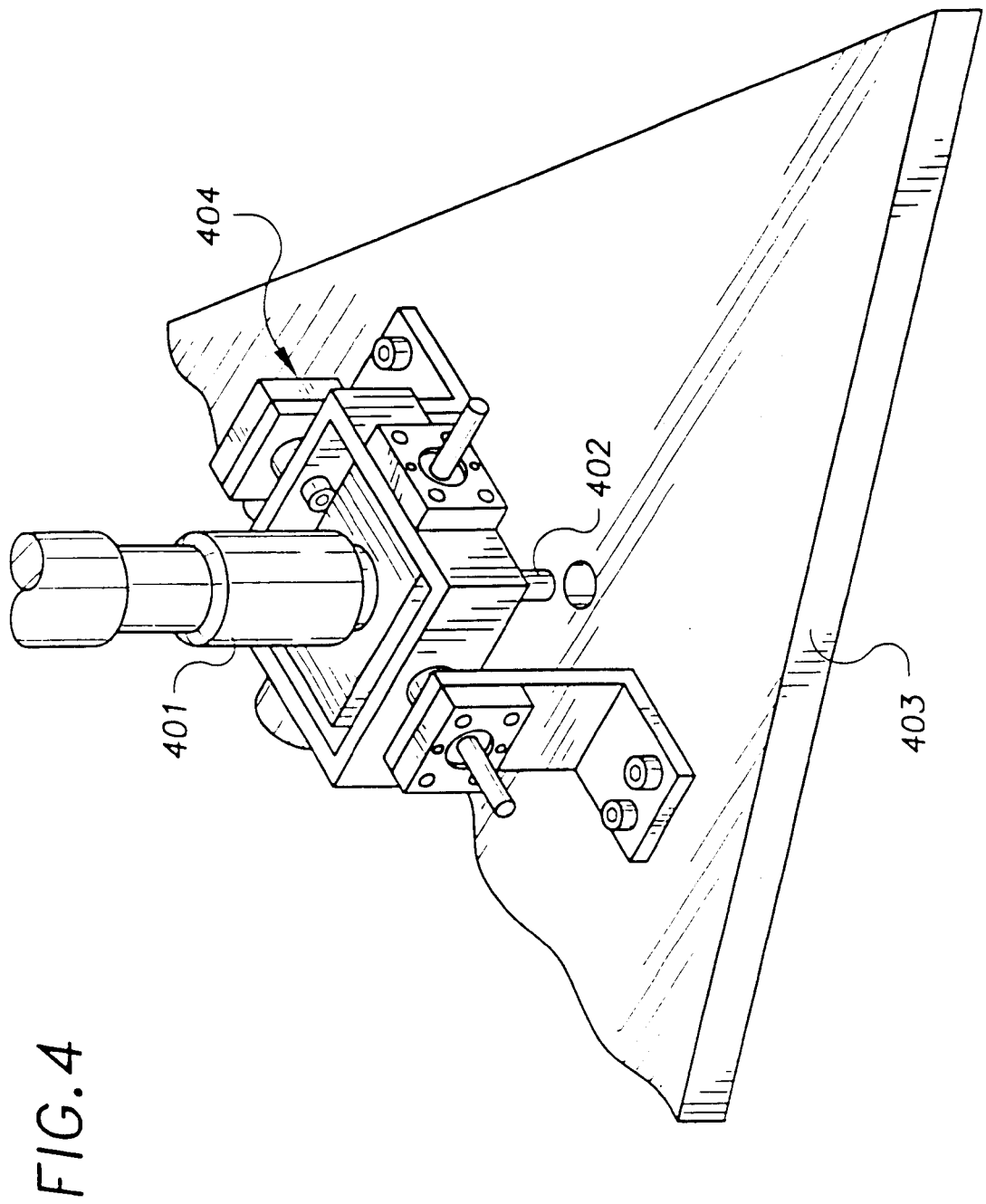
FIG. 4 shows the sensor assembly.

FIG. 4 shows another view of the gimbaled assembly. Rear leg 401 is attached to gimbaled assembly 404 which is mounted on base plate 403. The shaft 402 rotates with the rotation of leg 401 since they are attached. An encoder mounted on 402 will report the degree of twist of leg 401. Thus, as a torque is applied to the display plate 100, the rotation may be measured at shaft 402.

Figure 5:
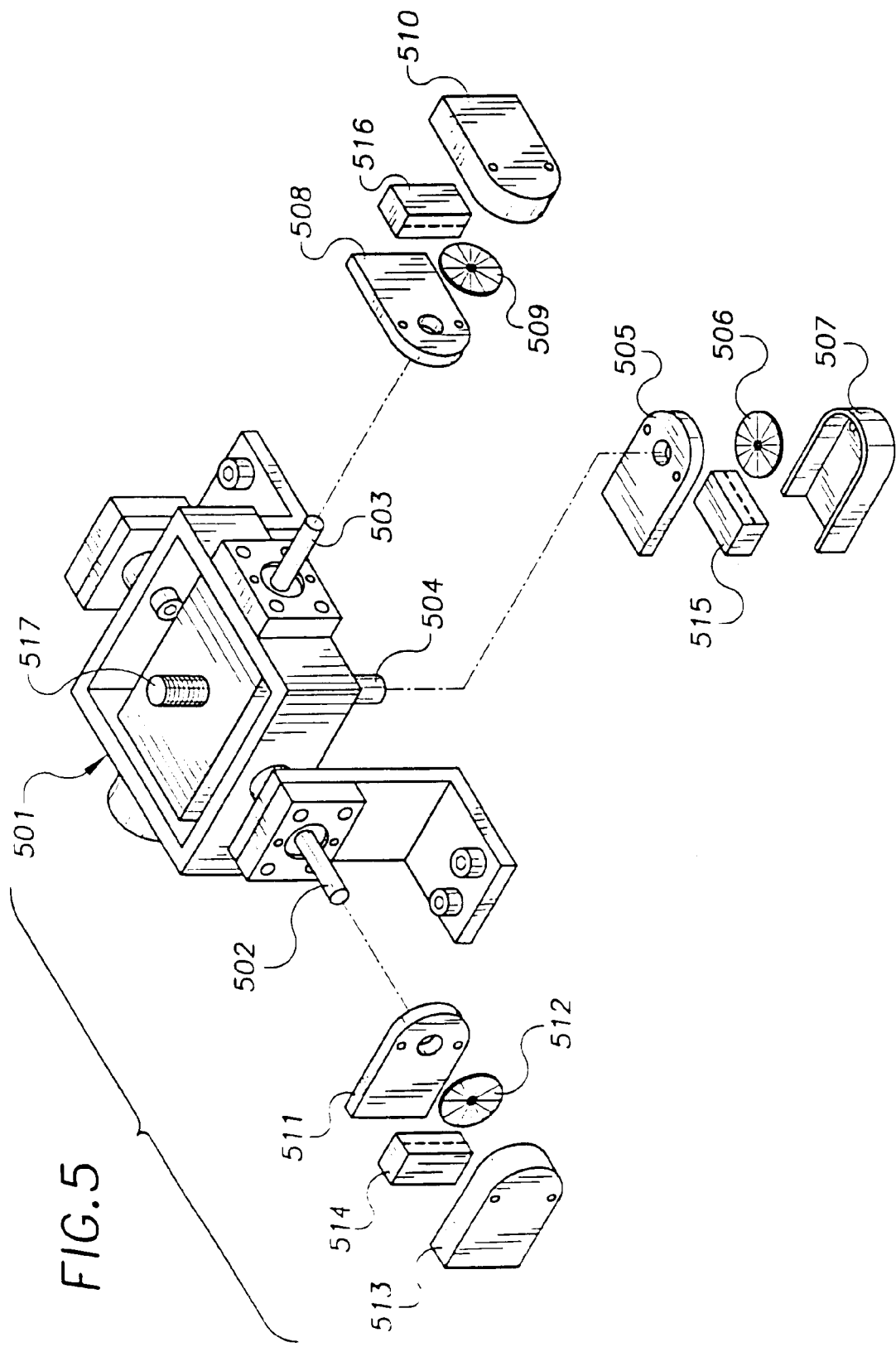
FIG. 5 shows where the encoders are mounted on the sensor assembly.

FIG. 5 illustrates how the encoders are mounted onto the gimbaled assembly 501. The rear leg is attached to threaded shaft 517. Shaft 503 encodes left/right motion of the platform and is measured by attachment of the encoder disk 509. The mounting plate 508, and reader 516 are mounted onto the gimbaled assembly. The cover 510 helps prevent dirt from fouling the encoder disk 509. Shaft 502 encodes forward/back motion of the platform. This motion is detected by attaching encoder disk 512 onto the shaft. The mounting plate 511 and reader 514 are attached to the gimbaled assembly and cover 513 prevents dirt from fouling the encoder disk. Twisting the platform results in a twist of the rear leg which is attached at 517 and appears at shaft 504 which is the other end of the threaded attachment point 517. Motion at shaft 504 is measured by attaching encoder disk 506 to the shaft 504. The base plate 505 and the reader 515 are attached to the gimbaled assembly and cover 507 prevents dirt from fouling the encoder disk 506.

Figure 6:
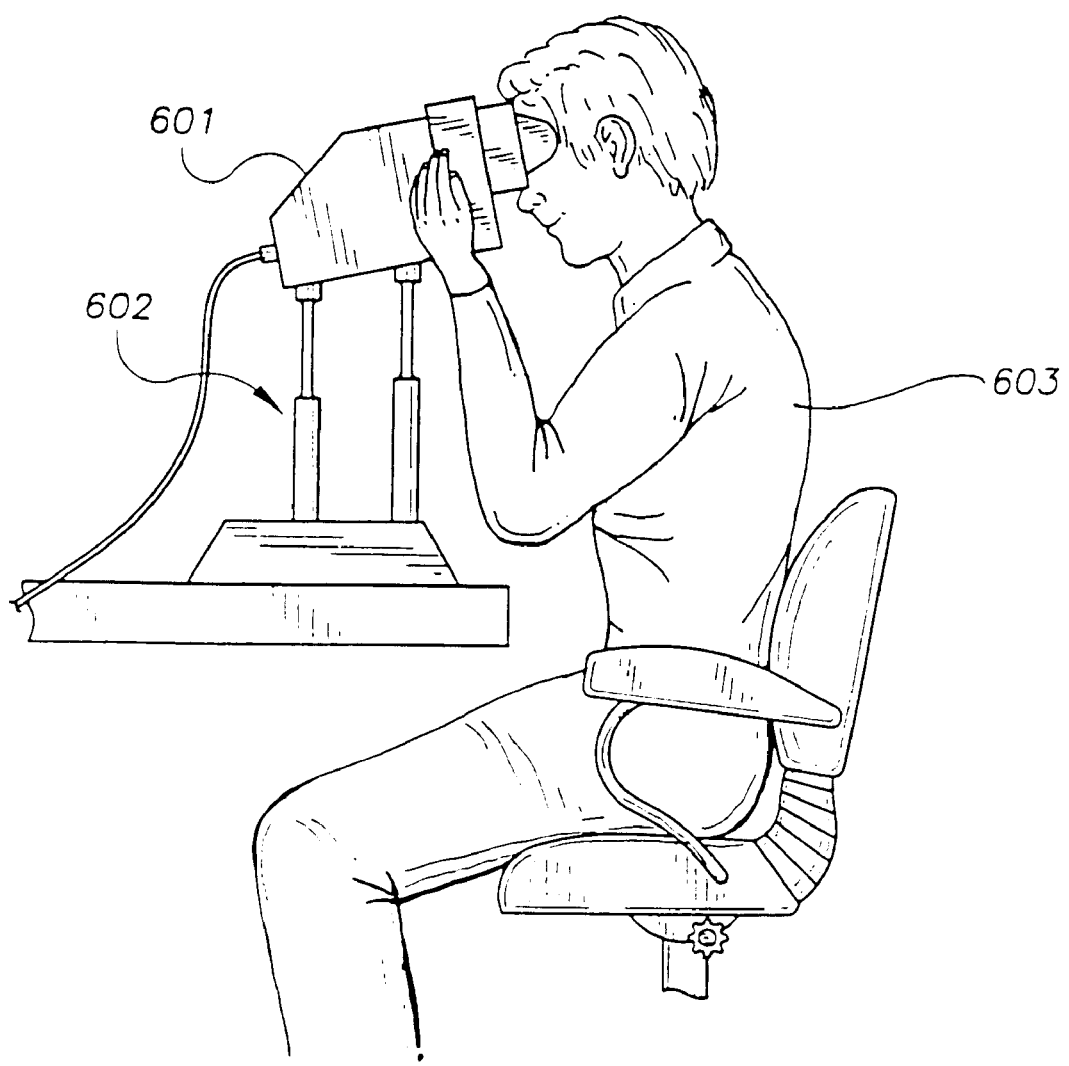
FIG. 6 shows how the display is mounted on the base and used.

FIG. 6 shows how the compliant platform is used. A user 603 looks into a display 601 mounted on the invention 602. The user may push the display forward and the encoders will register this motion and send it to the computer which is generating the images seen in the display 601. This will allow the user to move forward in the computer generated world. Pushing the display to the left will be measured in a similar fashion and the images updated accordingly. Twisting the display will be measured by third encoder of the gimbals and will result in turning in the virtual world. Combining these motions lets a user maneuver easily in the virtual world. In particular, sliding to the right and twisting to the left at the same time results in an orbiting motion which is good for looking at the other side of an object. Slightly pushing forward at the same time results in a spiral path.

Figure 7:
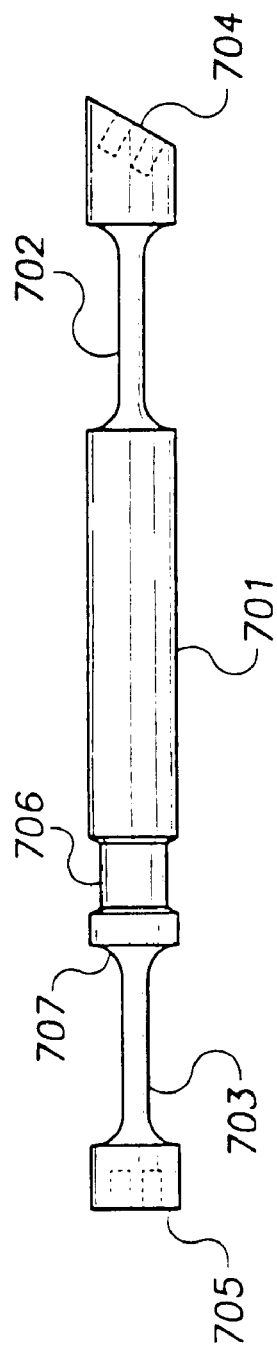
FIG. 7 shows the dimensions of the two front legs

FIG. 7 shows the details on the construction of the front two legs. The main body of the delrin leg 701 joins the two flexible hinge areas 703 and 702. The leg is mounted with two screws to the base plate at the end 705. The end 704 is angled to mate with the mounting plate for the display and is also attached with two fasteners so the leg can't rotate. The necking down 706 is so that a cover does not bind on the main body of the leg at maximum deflection. The joint between the hinges 703 and 702 with the main body of the leg 701 are radiused as shown at 707.

Figure 8:
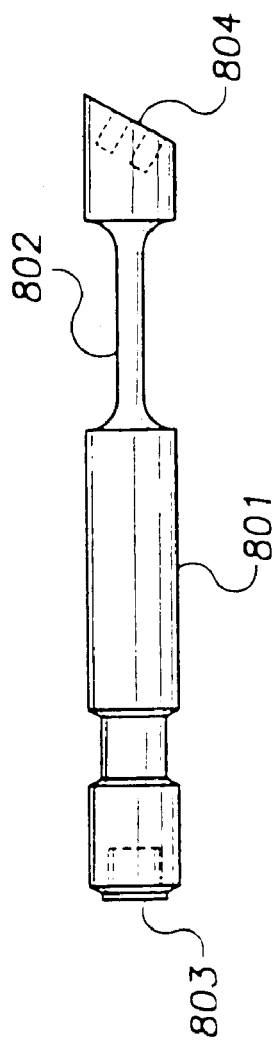
FIG. 8 shows the detail of the rear leg which attaches to the gimbaled sensor means.

FIG. 8 shows the structure of the rear leg. This delrin part is similar to the front legs. Main body 801 is attached to the gimbaled assembly by threaded hole 803. The plate for mounting the display is attached to the leg at the angled end 804. The hinge for the leg is 802 and the transition from the main body of the leg to the hinge is radiused in a similar manner to the front legs.

The structure is compliant in that the three legs are springy. The top plate on which a display may be mounted moves substantially in a plane relative to the base plate. This motion is measured by the gimbaled sensor assembly at the base of the rear leg. The encoders used to measure the motion could be replaced by another sensing means. For example, the encoders could be replaced by rotary potentiometers to measure the angles. Another alternative would be to use rotary switches.

In addition to having the leg members including an explicit hinge, it would be possible to design legs where the flexing occurred over the entire length of the leg. In this invention, the legs are made on a lathe from round stock but making legs whose hinge elements were not symmetric about the vertical axis would allow one to adjust the springiness in particular directions. By adjusting the cross section of the legs, a system could be made in which left-right motion was easy and forward-back motion more difficult, for example.

It would be possible to have more than two compliant supporting legs if desired. Thus if the display were particularly heavy or for aesthetic reasons, a number of additional legs could be introduced without impacting the performance of the structure.

At present, the range of motion of the structure is limited by having a cover with three holes mounted part way up the structure. Then when the structure is pushed to the limit, the legs bang into the edges of the holes in the cover.

We claim:

1. A device for mounting a display, said device comprising:
   a first leg and a second leg, said first and second legs being attached at their lower ends to a base plate, and supporting at their upper ends a platform;
   wherein the first leg is secured to the base plate with a gimbaled assembly allowing the first leg to tilt and rotate in relation to the base plate;
   wherein the second leg is secured to the base plate in such a manner that it may tilt in relation to the base plate, but is restricted from rotating about an axis perpendicular to the plane of the base plate; and
   wherein said platform is operably connected to a sensor assembly which senses the position of the platform in relation to the base plate.

2. The display system of claim 1 wherein the second leg comprises a main body and a hinge element, wherein the hinge element is sized and dimensioned such that the platform is biased move preferentially along a predetermined direction relative to the base plate.

3. A display system mounted on a compliant structure comprising:
   a first leg and a plurality of additional legs, said first leg and plurality of additional legs being attached at their lower ends to a base plate, and supporting at their upper ends a platform;
   wherein the first leg is secured to the base plate with a gimbaled assembly allowing the first leg to tilt and rotate in relation to the base plate;
   wherein the plurality of additional legs are secured to the base plate in such a manner that the plurality of additional legs may tilt in relation to the base plate, but are restricted from rotating about an axis perpendicular to the plane of the base plate;
   and wherein said platform is operably connected to a sensor assembly which senses the position of the platform in relation to the base plate; and
   an electronic display and a computer which generates and transmits an image to the electronic display, wherein the electronic display is mounted on the platform, and the sensor assembly provides information regarding the position of the platform to a computer, and wherein the computer generates and transmits images to the electronic display which vary according the sensed position of the platform.

4. The display system of claim 3 wherein the plurality of additional legs comprises two additional legs.

5. The display system of claim 3 wherein at least one leg of the plurality of additional legs comprises a main body and a hinge element, wherein the hinge element is sized and dimensioned such that the platform is biased to move preferentially along a predetermined direction relative to the base plate.

6. A system for controlling an image displayed on a display screen, said system comprising:
   a computer programmed to generate images for display on the display screen in response to physical movement of the display screen;
   a platform for supporting the display screen;
   a base plate;
   a first leg and a plurality of additional legs, said first leg rotatably and tiltably secured to the base plate, wherein the display screen is supported by the first leg and the plurality of legs and the display screen may be moved in relation to the base plate; and
   a sensor assembly operably connected to the first leg for sensing the tilt and rotation of the first leg, the sensor assembly also being operably connected to the computer and transmitting tilt and rotation information regarding the first leg to the computer;
   wherein said computer receives tilt and rotation information from the sensor assembly of the first leg, calculates the position of the display screen based upon said tilt and rotation information, generates an image for display on the display screen based upon the position of the display screen, and transmits the image to the display screen;
   wherein the plurality of additional legs are made of material having sufficient flexibility to permit movement of the platform relative to the base;
   wherein at least one of the plurality of additional legs comprises a main body and a hinge element, wherein the hinge element is sized and dimensioned such that the platform is biased to move preferentially along a predetermined direction relative to the base plate.

* * * * *